US008644651B2

(12) United States Patent
Dougherty et al.

(10) Patent No.: US 8,644,651 B2
(45) Date of Patent: Feb. 4, 2014

(54) UNIFORM LIGHT SOURCE FOR AN IMAGING INSTRUMENT

(75) Inventors: William Dougherty, Kenmore, WA (US); Kyle Curts, Bellevue, WA (US)

(73) Assignee: GE Healthcare Bio-Sciences Corp., Piscataway, NJ (US)

( * ) Notice: Subject to any disclaimer, the term of this patent is extended or adjusted under 35 U.S.C. 154(b) by 247 days.

(21) Appl. No.: 13/091,941

(22) Filed: Apr. 21, 2011

(65) Prior Publication Data

US 2011/0286232 A1 Nov. 24, 2011

Related U.S. Application Data

(60) Provisional application No. 61/326,483, filed on Apr. 21, 2010.

(51) Int. Cl.
*G02F 1/335* (2006.01)
*G02F 1/295* (2006.01)

(52) U.S. Cl.
USPC ................................................ 385/7; 385/4

(58) Field of Classification Search
USPC ............................................................ 385/7
See application file for complete search history.

(56) References Cited

U.S. PATENT DOCUMENTS

| 4,011,403 | A * | 3/1977 | Epstein et al. ............... 348/370 |
| 4,516,848 | A * | 5/1985 | Moriya ........................ 399/100 |
| 4,806,859 | A * | 2/1989 | Hetrick ..................... 324/207.15 |
| 6,327,405 | B1 * | 12/2001 | Leyva et al. ...................... 385/37 |
| 6,868,212 | B2 * | 3/2005 | DeWitte et al. ................. 385/123 |
| 7,969,644 | B2 * | 6/2011 | Tilleman et al. ............... 359/298 |
| 8,019,189 | B2 * | 9/2011 | Shimotsu ......................... 385/50 |
| 2004/0175081 | A1 * | 9/2004 | DeWitte et al. ............... 385/123 |
| 2007/0233044 | A1 * | 10/2007 | Wallace et al. ................. 604/528 |
| 2009/0151485 | A1 * | 6/2009 | Pais et al. .......................... 74/61 |
| 2009/0232438 | A1 * | 9/2009 | Shimotsu ........................... 385/1 |
| 2009/0245303 | A1 * | 10/2009 | Shimotsu ......................... 372/27 |
| 2010/0053729 | A1 * | 3/2010 | Tilleman et al. ............... 359/298 |

* cited by examiner

*Primary Examiner* — Rhonda Peace

(57) ABSTRACT

The approach of one embodiment of the present invention is to mechanically vibrate a length of fiber optic cable transmitting coherent laser light, so that a mechanical resonance in the optical fiber is excited. This is achieved by suspending the fiber optic cable between two points and controlling both the axial tension on the suspended fiber optic cable as well as the mechanical forcing frequency. The cyclic, high-frequency mechanical perturbations of the fiber rapidly vary the path length and internal reflection angles of one or more respective modes of the transmitted laser light. In certain embodiments, the system may be tuned to induce a standing mechanical wave in the fiber. Higher-harmonic waveforms and higher amplitudes in the resonant fiber produce excellent speckle reduction and uniform intensity distributions.

17 Claims, 4 Drawing Sheets

UNIFORM LIGHT SOURCE FOR AN IMAGING INSTRUMENT

CROSS-REFERENCE TO RELATED APPLICATION

This application claims the benefit of Provisional Application No. 61/326,483, filed Apr. 21, 2010.

TECHNICAL FIELD

The present invention is related to optics and imaging devices and, in particular, to a laser light source that provides a uniform distribution of light intensity to a sample within the imaging instrument.

BACKGROUND OF THE INVENTION

It is increasingly common to use laser light as an illumination source for optical microscopy. Among the advantages of many lasers are superb brightness, narrow spectrum, long instrument life, and low heat production. The finite coherence length of laser light, a singular advantage for many laser applications, is a detriment in wide field microscopy because of laser speckle. Speckle is observed as a spatially fluctuating pattern of light and dark that is familiar to users of laser pointers. It is caused by the random coherent superposition of light that has traveled different paths from a laser light source to a sample illuminated by the laser light, and can be a formidable obstacle to uniform illumination of a field within an imaging instrument. The use of lasers in wide field microscopy is often forsaken because of speckle.

Where random amplitudes interfere constructively, the speckle field is bright. Where random amplitudes interfere destructively, the speckle field is dark. While the electric fields of the light oscillate at high frequencies (on the order $10^{14}$ Hz), for a fixed optical propagation path, the time-averaged spatial phase relationships remain fixed.

One commonly used strategy to cope with speckle is to vary the optical propagation path on a time short compared to the response of the eye (on the order of tens of milliseconds) or short microscope camera exposures (on the order of one millisecond). The time-averaged speckle can be acceptably smooth when the speckle modulation is both sufficiently deep and sufficiently rapid.

It is also common to couple the laser illumination source to the microscope via a multimode fiber optic cable. The coherent light travels through the fiber optic cable in multiple electromagnetic modes, which can be thought of as independent solutions of Maxwell's Equations for propagation in an optical waveguide. By varying the geometry of the cable, phase relationships between the independent modes change, and thus their coherent geometric superposition changes as well.

Currently-used approaches include a vibrating fiber coil, piezo-electric fiber-stretcher, holographic diffuser (spinning disk), fiber optic elements for reducing speckle noise, and gross mechanical manipulators. However, each of these approaches suffers from significant shortcomings and limitations. For example, vibrating coils exhibit low frequency motion and do not take advantage of the natural vibration modes of the cables and also display poor speckle abatement. Piezo fiber stretchers offer limited fiber types, and display lifetime fatigue issues and poor speckle abatement. In addition, they are inefficient optically. Fiber optic elements also exhibit poor speckle abatement and are complicated to manufacture. Gross mechanical manipulators are clumsy, noisy, and develop fiber fatigue.

SUMMARY OF THE INVENTION

The approach of one embodiment of the present invention is to mechanically vibrate a length of fiber optic cable transmitting coherent laser light, so that a mechanical resonance in the optical fiber is excited. This is achieved by suspending the fiber optic cable between two points and controlling both the axial tension on the suspended fiber optic cable as well as the mechanical forcing frequency. The cyclic, high-frequency mechanical perturbations of the fiber rapidly vary the path length and internal reflection angles of one or more respective modes of the transmitted laser light. In certain embodiments, the system may be tuned to induce a standing mechanical wave in the fiber. Higher-harmonic waveforms and higher amplitudes in the resonant fiber produce excellent speckle reduction and uniform intensity distributions.

DETAILED DESCRIPTION OF THE INVENTION

Changing the physical shape of a fiber optic cable (by bending or stretching) changes the path length and optical geometry of the coherent laser beam traveling through the fiber core. Modest changes in the optical path cause substantial changes in the speckle pattern. In microscopy and other imaging modalities, it is desirable to obtain an evenly distributed intensity profile averaged over the entire exposure of the sample (typically 1-1000 ms). Varying the speckle pattern at a high frequency during the exposure accomplishes this.

The approach of one embodiment of the present invention is to mechanically vibrate a length of fiber optic cable transmitting coherent laser light, so that a mechanical resonance in the optical fiber is excited. This is achieved by suspending the fiber optic cable between two points and controlling both the axial tension on the suspended fiber optic cable as well as the mechanical forcing frequency. The cyclic, high-frequency mechanical perturbations of the fiber rapidly vary the path length and internal reflection angles of one or more respective modes of the transmitted laser light. In certain embodiments, the system may be tuned to induce a standing mechanical wave in the fiber. Higher-harmonic waveforms and higher amplitudes in the resonant fiber produce excellent speckle reduction and uniform intensity distributions. This approach provides a robust, tunable, and high frequency scrambling means to reduce laser speckle over short time periods. This approach allows the use of sheathed cable that's easy to handle, without lossy fiber-to-fiber connections. No fiber fatigue was observed over months of operation of one embodiment of the present invention.

Embodiments of the present invention can be tuned to a variety of cable sizes and lengths. With the individual tension adjustment and vibrating frequency control, is it possible to tune the system to precise harmonics. By exciting the cable at a harmonic frequency, we can take advantage of the cables natural wave motion to create very high frequency motion in the fiber. This, in turn, provides high frequency speckle pattern variation. This high frequency motion allows for more uniform intensity distribution over shorter time periods which allow for shorter exposure times.

Figure 1:
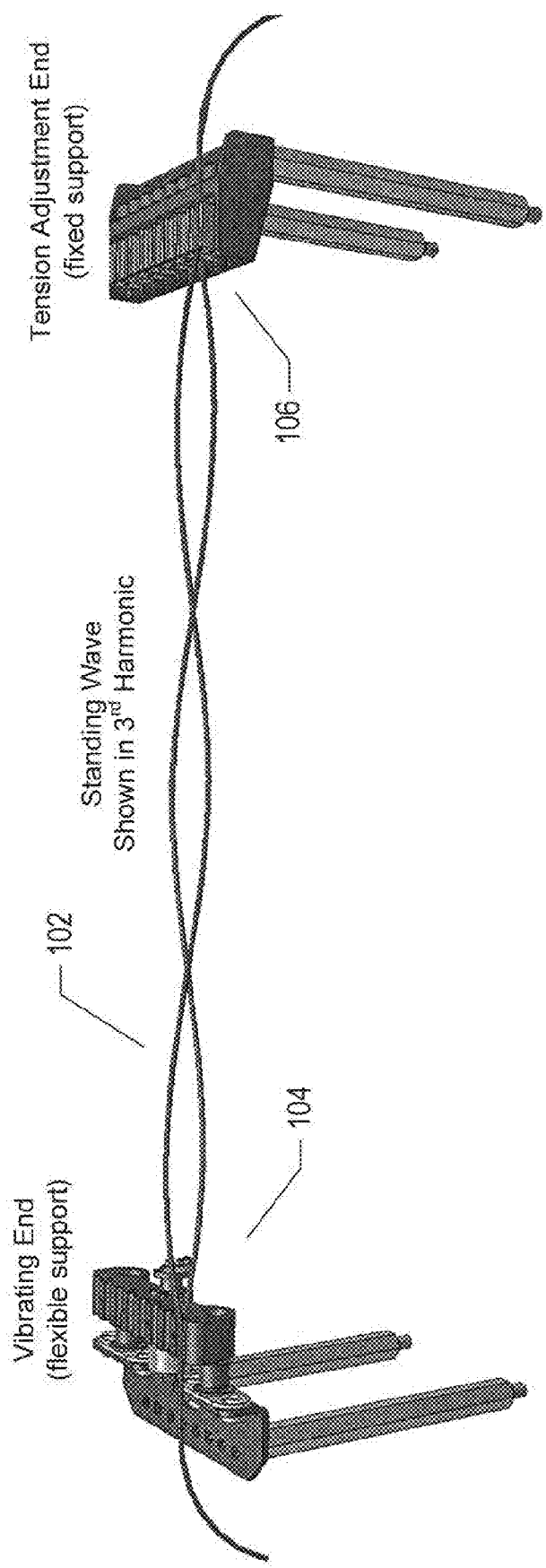
FIG. 1 illustrates one embodiment of the present invention.

FIG. 1 illustrates one embodiment of the present invention. In the embodiment of the present invention shown in FIG. 1, a length of fiber optic cable 102 is supported at two ends 104 and 106 and suspended, with the fiber optic cable thus mechanically isolated from touching another body. In this embodiment, the suspended portion of the fiber optic cable has a length of approximately 1 meter. In alternative embodiments, the length can range from 10 cm to 3 m, 100 cm to 2 m, and 500 cm to 1.5 m, respectively. One end 106 is completely fixed in space and includes independent provisions to adjust the tension in the cable. The other end 104 is rigid axially with the cable but allows a degree of transverse motion in a plane perpendicular to the mean axis of the suspended cable.

Figure 2:
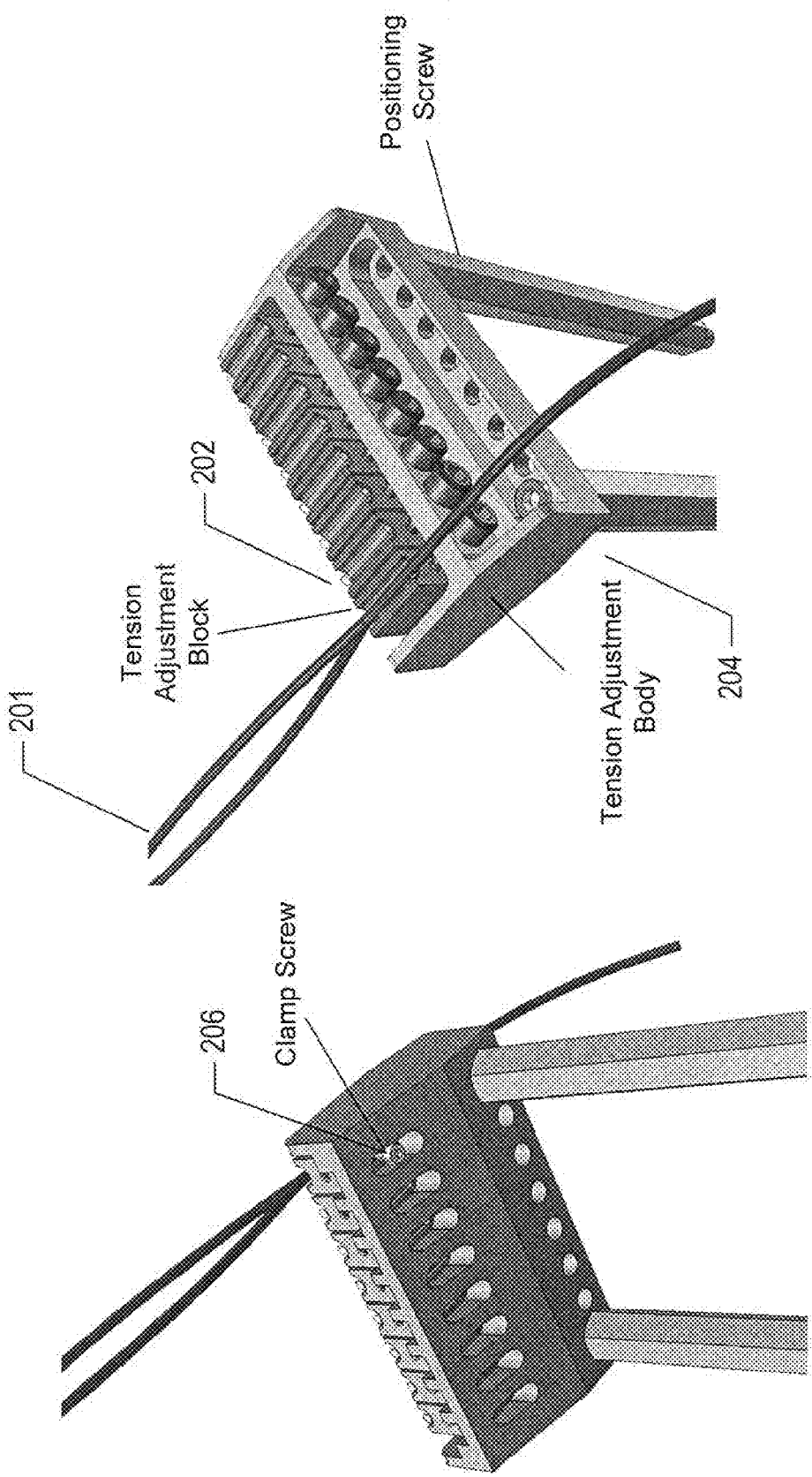
FIG. 2 shows the tension-adjusting mechanical mount of one embodiment of the present invention.

FIG. 2 shows the tension-adjusting mechanical mount of one embodiment of the present invention. The cable 201 is glued into individual tension adjustment blocks 202 within the tension adjustment body 204, as seen in FIG. 2. These blocks can be moved via a positioning screw and held firmly in place via a clamp screw 206. Adjusting the tension blocks longitudinally along the mean axis of the cable is the means to set a precise tension to the cable.

The shaker generally induces independent vibration modes in orthogonal planes (vertical and horizontal). It is possible and may be desirable to excite different resonance frequencies in the orthogonal planes.

Figure 3:
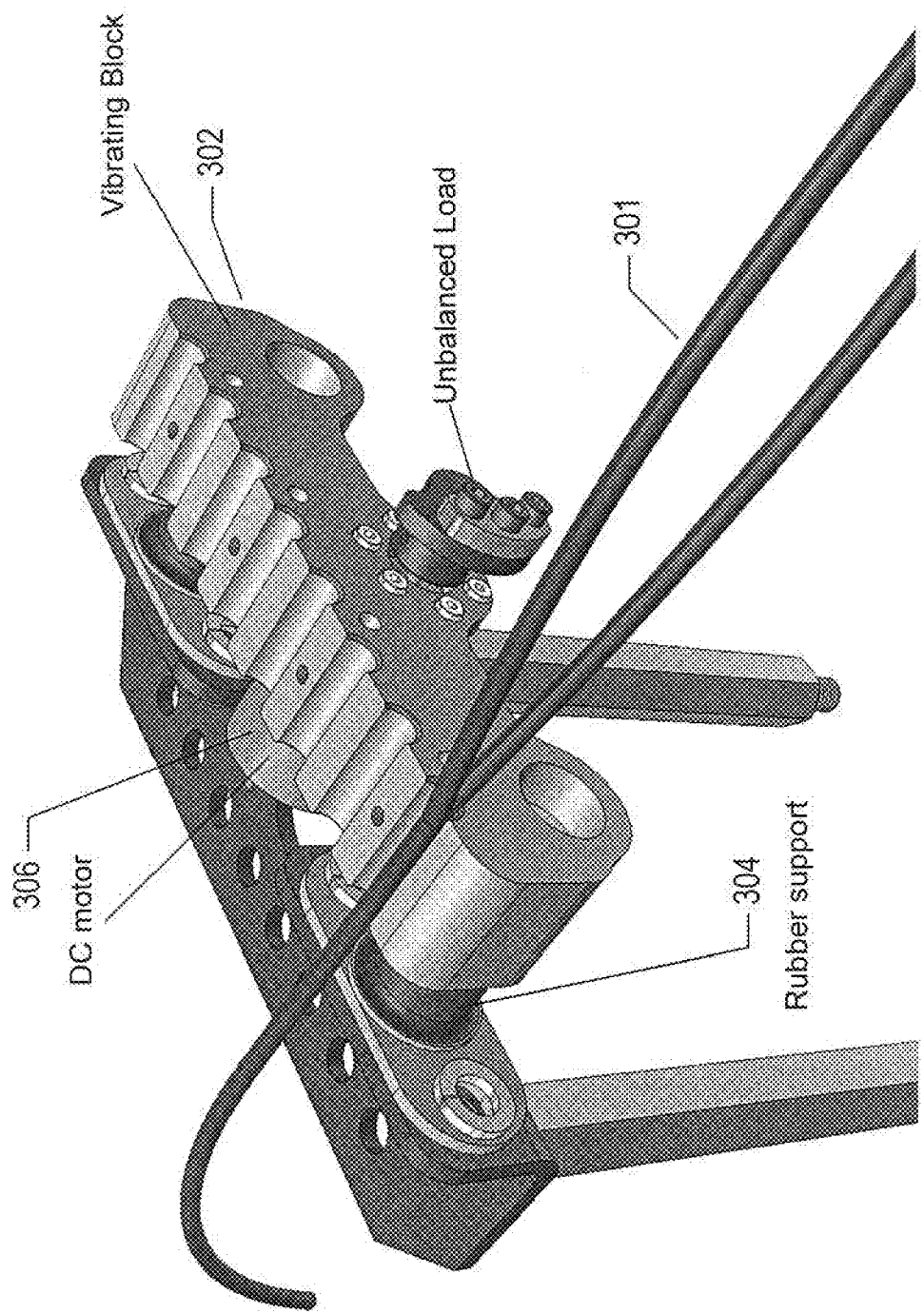
FIG. 3 shows the vibration-inducing mechanical mount of one embodiment of the present invention.

FIG. 3 shows the vibration-inducing mechanical mount of one embodiment of the present invention. The other end of the cable 301 is glued securely to a vibrating block 302. This block is supported by flexible rubber supports 304. The vibration motion is provided by an electric DC motor 306 with speed control coupled with an unbalanced load. The motor is directly attached to the vibrating block. The unbalanced load and the rotational speed of the motor provide a tunable forcing frequency which translates directly into the cable.

Virtually any fiber, including any multimode fiber, of any diameter fiber can be accommodated, with cladding and protective sheathing. It is possible to pass multiple fibers (even of different type and size) across this invention because of the individual tension adjustments blocks. By tuning the forcing vibration frequency via the motor speed (ultimately via current/voltage control) and the individual tension adjustments via the tension adjustment screws, it is possible to obtain standing waves in each cable independently from one another.

When the suspended cable's tension and frequency is matched with its fundamental frequency or one of its derived harmonics, standing waves form in the cable. It is at these harmonic frequencies that the best speckle reduction is observed. Higher order harmonics lend to better intensity distribution of the output laser beam over shorter periods of time because the shape/path of the cable is changing rapidly, causing the speckle pattern to change rapidly.

The efficacy of speckle reduction may be observed by comparing multiple images made under nominally identical conditions. Speckle modulation may also be observed by placing a fast photodetector in a speckle field such that the photodetector active element typically subtends one "speck" and observing the waveform with an oscilloscope as a YT trace or as a Fourier transform.

Figure 4:
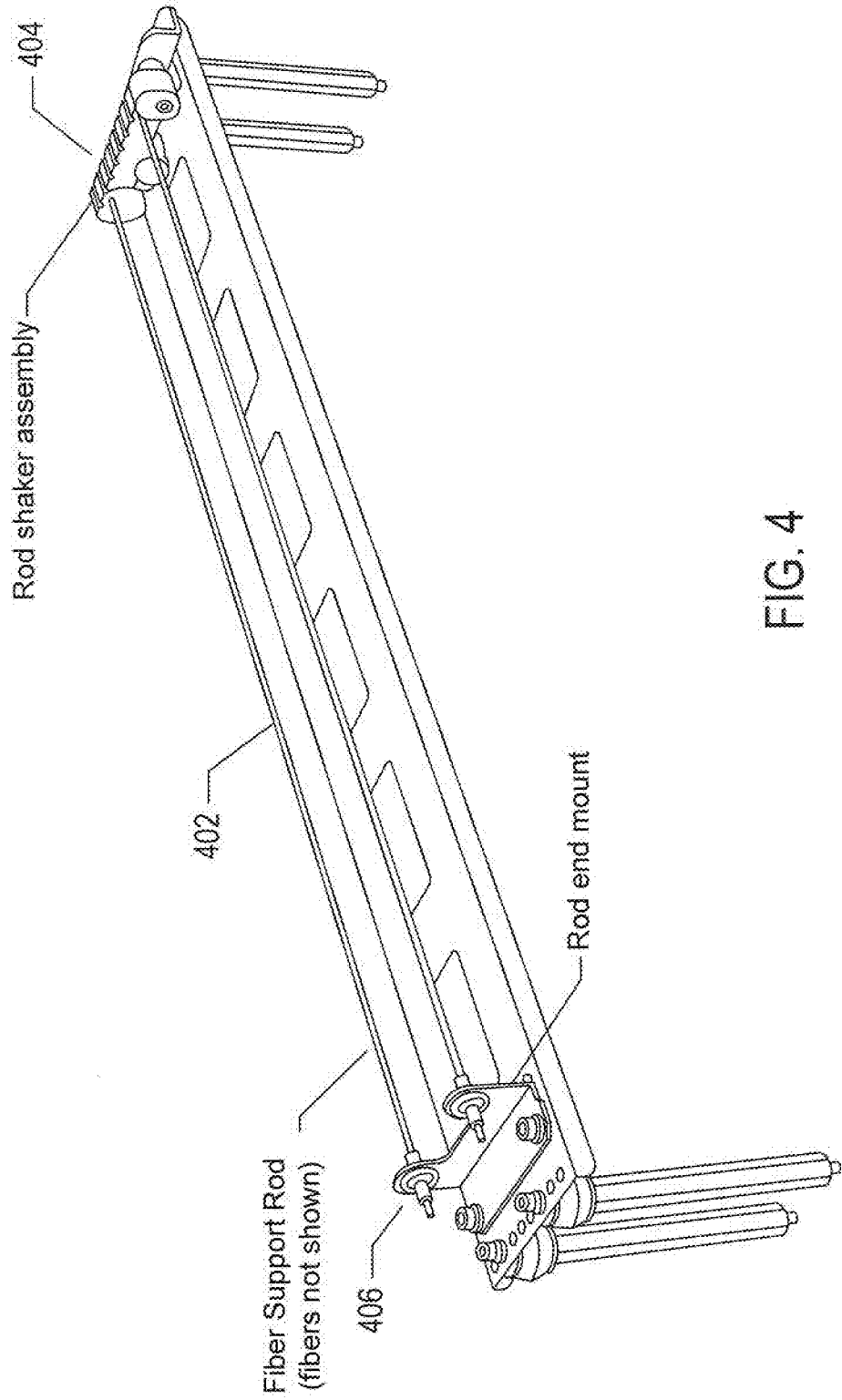
FIG. 4 shows a support-rod structure employed in an alternative embodiment of the present invention.

FIG. 4 shows a support-rod structure employed in an alternative embodiment of the present invention. In the alternative embodiment of the present invention, the fiber optic cable 402 is coupled to a support rod suspended between two mechanical mounts 404 and 406. The fiber optic cable can be clamped to the support rod in one or more positions or may be loosely coiled along the support rod. Use of the support rod ensures that little stress and strain is applied to the fiber optic cable, preventing fatigue, stretching, and other deleterious effects over time. Tension adjustment can be incorporated into the rod end mount 406 and/or the rod shaker assembly 404. The rod shaker assembly includes a vibration-inducing motor, as in the previously described embodiment. The support rod may be flexible, to assist in transmission of mechanical vibration to the fiber optic cable.

The invention claimed is:

1. A light source for an imagining instrument comprising: a laser; and a fiber-optic cable, a first end of which receives coherent light from the laser, a second end of which outputs light to illuminate a sample within the imaging instrument, and an internal section of which is suspended between a tension-adjuster mechanical mount that can be adjusted to vary the tension in the internal section of fiber-optic cable and a vibrating mechanical mount that, by vibrating, imparts a mechanical vibration to the internal section of fiber-optic cable thereby varying light path lengths and internal reflection angles within the fiber-optic cable to provide uniform output-light intensity to the sample.

2. The light source of claim 1 wherein the internal section of fiber-optic cable has a length of between 10 cm and 3 meters.

3. The light source of claim 1 wherein the internal section of fiber-optic cable has a length of between 100 cm and 2 meters.

4. The light source of claim 1 wherein the internal section of fiber-optic cable has a length of between 500 cm and 1.5 meters.

5. The light source of claim 1, wherein the tension-adjuster mechanical mount includes individual tension adjustment blocks that can be moved, via a positioning screw, to adjust the tension in the internal section of fiber-optic cable, and can be clamped at a particular position corresponding to a particular tension in the internal section of fiber-optic cable by a clamp screw.

6. The light source of claim 1, wherein the vibrating mechanical mount includes a vibrating block, supported by flexible rubber supports, to which a vibration-inducing motor is attached.

7. The light source of claim 6, wherein the vibration-inducing motor is an electric DC motor with speed control coupled with an unbalanced load.

8. The light source of claim 6, wherein the vibration-inducing motor induces one or more vibration modes within the internal section of fiber-optic cable.

9. The light source of claim 6, wherein the vibration-inducing motor induces the internal section of fiber-optic cable to vibrate at one or more resonant frequencies.

10. The light source of claim 1 wherein the internal section of fiber-optic cable is coupled to a support rod suspended between the two mechanical mounts.

11. The light source of claim 10, wherein the fiber-optic cable is coupled to the support rod by loosely coiling the fiber-optic cable around the support rod.

12. The light source of claim 10, wherein the fiber-optic cable is coupled to the support rod by one or more clamps.

13. The light source of claim 10, wherein the internal section of fiber-optic cable and support rod is suspended between a rod-end mount and a rod-shaker assembly that, by vibrating, imparts a mechanical vibration to the internal section of fiber-optic cable.

14. The light source of claim 10, wherein the rod-end mount can be adjusted to vary the tension in the internal section of fiber-optic cable.

15. The light source of claim 10, wherein the rod-shaker assembly can be adjusted to vary the tension in the internal section of fiber-optic cable.

16. The light source of claim 10, wherein the rod-shaker assembly includes a vibrating block, supported by flexible rubber supports, to which a vibration-inducing motor is attached.

17. The light source of claim 16, wherein the vibration-inducing motor is an electric DC motor with speed control coupled with an unbalanced load.

\* \* \* \* \*